INVENTORS
CHARLES J. PEARSON
DANIEL A. CHUNG

United States Patent Office 3,677,869
Patented July 18, 1972

3,677,869
POLYUREAURETHANE SHOCK ABSORBING
COMPOSITIONS
Daniel A. Chung, Stow, and Charles J. Pearson, Akron,
Ohio, assignors to The Goodyear Tire & Rubber Company, Akron, Ohio
Filed Nov. 27, 1970, Ser. No. 93,326
Int. Cl. B32b 3/30; C08g 41/04; F16f 7/12
U.S. Cl. 161—42
19 Claims

ABSTRACT OF THE DISCLOSURE

A resilient shock absorbing polyureaurethane composition and shock absorbing units prepared therefrom, such as railroad draft gears. The shock absorbing composition may be characterized by deflecting from about 0.3 to about 0.6 inch at 25° C. upon the application of 1800 pounds per square inch to the end surfaces of the composition when it is generally disc-shaped of required dimensions with a V-shaped groove sidewall connecting its end surfaces. The polyureaurethane composition is prepared by reacting specific diamines with the reaction product of specific aromatic diisocyanates with a mixture of specific polyether polyols and polyester polyols of required amounts and required molecular weight ranges.

This invention relates to resilient cured polyureaurethane compositions suitable for shock absorbing elements and to a method for their preparation. It also relates to resilient compositions having a good shock absorbing ability over a relatively wide temperature range. The invention more specifically relates to shock absorbing elements for draft gears in railroad cars and for bridge support pads.

Shock absorbing compositions having an ability to absorb large shocks over a relatively wide range of load values have long been sought. Furthermore, shock absorbing compositions having the ability to absorb such large shocks over a relatively wide range of medium to low temperatures, such as at least from about 50° C. to about —40° C., have also been long sought. Examples of such desired shock absorbing compositions are shaped compositions as elements or units for railroad draft gears and for bridge support pads. Both types of units are required to successfully absorb shocks over a wide range of load values and over a relatively wide range of temperatures.

Railroad draft gears are shock absorbing devices used on railroad cars to absorb substantial shocks resulting from the coupling of the railroad cars. Various devices have been used for such draft gears. The steel spring could be used for such a device primarily because it has good shock absorbing characteristics at both low and very high load values. Its ratio of compression to an applied load is substantially constant over a wide range of applied load values. However, steel springs are not practical for use as draft gears in railroad cars because a very large size would be required.

Consequently, shock absorbing devices have been fabricated from other materials such as rubber and other elastomers, and used for draft gears. One type of shock absorbing device has comprised a series of shock absorbing units or pads in the general shape of a disc with concave sides. Each shock absorbing unit in the series comprised a resilient solid rubber or rubber-like element disposed between and attached to two opposing force-receiving supports or plates. The shock absorbing units or pads were disposed in series to the shock load by placing them in a cylinder with their planar surfaces facing each other. The side-walls of the rubber-like elements were generally concave. Thus, as a shock or a load was applied to the draft gear, the series of shock absorbing units offered a cooperative cushioning or shock absorbing resistance to the applied load and, upon being compressed by the load, the rubber-like elements deformed laterally and their sidewalls were forced into the space provided between the concave sides of the rubber-like elements and the side of the cylinder.

However, these shock absorbing devices generally have shock absorbing characteristics substantially inferior to that of a steel spring over a wide range of load values. The devices typically have good shock absorbing characteristics at low loading values and poor shock absorbing characteristics at high loads. Usually their resistance to compression substantially increases at high load values. They can even exhibit excessive compression set and have low endurance under repeated stress. They can bottom out at high shocks. Thus, under the heavy repetitive shock loads to which a draft gear is subject, such a shock absorbing device can have relatively little shock absorbing value.

An exception to such disadvantageous shock absorbers are those described and claimed in U.S. Pat. 3,504,901 which provides elements or units having desirable load versus deflection characteristics and dynamic stability over a wide range of load values suitable for use in a draft gear. However, even these shock absorbing units have serious disadvantages since at low temperatures, such as below about —20° C. they tend to stiffen and/or transmit shock directly to the railroad car without absorption with extensive shock loads. Furthermore, compressive set tends to become a serious problem with shock absorbers at low temperatures. Compressive set is evidenced by a relatively slow rate of the absorber returning to its original shape after removal of a compression force.

Thus, in view of these substantial and demanding shock absorbing requirements, it is an object of this invention to provide an improved resilient shock absorbing composition. It is a further object to provide such a composition suitable as a shaped element for railroad draft gears and for bridge support pads.

In accordance with this invention, it was discovered that improved shock absorbing compositions are certain resilient polyureaurethane compositions characterized by deflecting from about 0.3 to about 0.6 inch, preferably from about 0.4 to about 0.5 inch, at about 25° C. upon the application of about 1800 pounds per square inch uniformly to the end surface areas (force-receiving surfaces) of the said resilient compositions when the said compositions are generally disc shaped cylindrical elements with circular parallel end surfaces having diameters of about 6.5 inches, a height of about 1.5 inches, and a side-wall connecting the end surfaces substantially in the form of a V-shaped groove having substantially equal sides, the said groove extending between the said end surfaces, the volume of the solid portion of the said elements being about 150 percent of the volume of the said groove. In further accordance with this invention, it was discovered that an improved draft gear unit or pad having good shock absorbing characteristics over a wide range of load values and through a wide temperature range comprises such a composition having the deflection characteristic at about 25° C. and particularly when comprising such a shaped element having substantially rigid force-receiving plates adhered to its end surface areas (force-receiving surfaces).

Thus, a shock absorbing unit of this invention, suitable for use in a railroad draft gear, comprises a shock absorbing element, the said element comprising a solid disc shaped resilient, polyureaurethane composition of this invention having the said deflection characteristic at about 25° C. and having two opposing and substantially parallel force-receiving surfaces connected by at least one sidewall, preferably a concave sidewall, and having rigid force-receiving plates, preferably metal plates, adhered to its force-receiving surfaces. Correspondingly, the shock absorbing device of a railroad draft gear comprises a series of such units, such as about 8 to about 12 and preferably 10, loaded in a cylinder in series to the shock load, with their force-receiving plates facing each other.

In additional accordance with this invention, a bridge pad is provided comprising a shaped resilient polyureaurethane composition of this invention supportably and shock absorbingly positioned between a bridge load carrying member and a bridge foundation member. The invention thus further relates to the bridge construction resulting therefrom, comprising the bridge load carrying member shock absorbingly supported on its foundation member by the said shaped polyureaurethane composition.

The resilient polyureaurethane compositions of this invention are preferably further characterized by a −40° C. cold temperature compression test in addition to the deflection characterization test at about 25° C. According to this test, the said composition, at about −40° C., when shaped and cured to a solid, circular disc with a straight side-wall, having a diameter of about 1.13 inch and a thickness of about 0.5 inch, requires a maximum pressure of 7500, and preferably a maximum pressure of 6000, pounds per square inch, applied to its flat surfaces to compress the disc 40 percent. This cold temperature compression test is a measure of stiffening of the polyureaurethane composition at low temperatures. It is a measure of the composition's ability to absorb energy without hardening and transmitting shock directly without absorption. A shock absorber of this invention has essentially bottomed out when its percent compression is substantially constant and its percent compression versus load curve substantially horizontal at high load values. The quality of high energy absorption without bottoming out is particularly required for railroad draft gears which are subject to large shocks over a relatively wide range of temperatures including temperatures down to about −40° C.

The shaped resilient shock absorbing polyureaurethane compositions of this invention are prepared by shaping and curing a polyureaurethane reaction mixture. The basic polyureaurethane compositions of this invention suitable for the said shock absorbing units and bridge pads are prepared from a reaction mixture by reacting diamines selected from the group consisting of 4,4'- methylene bis-ortho-chloroaniline and orthodichlorobenzidine with the reaction product of (A) at least one diisocyanate selected from diphenylene methane-4,4'-diisocyanate and a mixture of 2,4- and 2,6-toluene diisocyanates containing from about 60 to about 100, with the preferred range being about 70 to about 90, weight percent 2,4-toluene diisocyanate with (B) a mixture consisting of both polyether polyols and polyester polyols having a total average molecular weight in the range of about 900 to about 1500, said molecular weight being equivalent to the result of mixing (1) about 60 to about 85 weight percent of (a) at least one polytetramethylene ether glycol having an average molecular weight in the range of about 800 to about 1200 or (b) a mixture comprising about 30 to about 80 weight percent of at least one of said polytetramethylene ether glycols and correspondingly about 70 to about 20 weight percent of at least one polyester polyol having an average molecular weight in the range of about 800 to about 1500, preferably about 900 to about 1400, and correspondingly (2) about 40 to about 15 weight percent of polyols having an average molecular weight in the range of about 1800 to about 2200 selected from (a) at least one polytetramethylene ether glycol or (b) at least one polyester polyol, wherein said polyester polyols of 1(b) and 2(b) are individually selected from at least one of (x) caprolactone polyesters prepared from caprolactones containing 6 to 8, preferably 6, carbon atoms and glycols containing 4 to 7, preferably 4 to 6, carbon atoms, (y) adipates of adipic acid and glycols containing 4 to 7, preferably 4 to 6, carbon atoms and (z) azelates of azelaic acid and glycols containing 4 to 7, preferably, 4 to 6, carbon atoms. It is preferred that the polyester polyol of 1(b) is of the same components of 2(b).

In the specification, the term "total average molecular weight of about 900 to about 1500" is used to describe the total resulting molecular weight equivalent of a mixture of the polyether polyols (polytetramethylene ether glycols) and the mixtures of polyether polyols and polyester polyols. Thus, such a mixture having a total average molecular weight of 1400 can consist of such polyols having, for example, molecular weights of 1000, 1250 and 2000. Also, for example, a polytetramethylene ether glycol with an average molecular weight of 1500 mixed with a polyester polyol having a molecular weight of 1000, can be the molecular weight equivalent of mixing the polyester polyol with polytetramethylene ether glycols having molecular weights of about 1000 and about 2000. This type of mixture would satisfy the equivalent molecular weight requirements for the polyols mixture since it would be equivalent to the mixture of 1(b) and 2(a).

Preferably, the polyether polyol-polyester polyol mixture is selected from (a) polytetramethylene ether glycols having an average molecular weight of about 900 to about 1100 or a mixture with molecular weights of about 900 to about 1100 and of about 1900 to about 2100 and (b) at least one of the polyester polyols selected from hexane diol adipate and azelate having molecular weights of about 800 to about 1200, tetramethylene azelate having a molecular weight of about 1800 to about 2200 and polyesters of ε-caprolactone and diethylene glycol having molecular weights of about 1100 to about 1400 and about 1800 to about 2200.

It is a critical feature of this invention that the ratio of isocyanato groups of the disocyanate to the sum of the hydroxyl groups of the polyether polyol (polytetramethylene ether glycol) and polyester polyol is from about 1.7 to about 2.5 and preferably from about 1.8 to about 2.2.

It is preferred that a sufficient amount of diamine is used to provide a ratio of primary amino groups to excess isocyanato groups of the diisocyanate over the sum of the hydroxyl groups of the polyether polyols and polyester polyols (reactive hydrogen-containing materials) in the range of about 0.6 to about 1 and preferably from about 0.7 to about 0.95. Thus, for example, it is desired that from about 0.4 to about 1.1 moles of the diamine is added to the reaction product of the mixtures comprising correspondingly from about 1.7 to about 2.5 moles, preferably from about 1.8 to about 2.0 moles, of the diisocyanate and about 1 mole of the polyether polyol or mixture of polyether polyol and polyester polyol.

It is a further required feature of the invention that the polytetramethylene ether glycols, the caprolactone polyesters, the adipates, the azelates and their mixture have an acid number of less than about 1, desirably less than about 0.5 and more preferably less than about 0.1.

The polytetramethylene ether glycol is of the structure and composition typically prepared from tetrahydrofuran with the aid of an alkylene oxide initiator having 2 to 4 carbon atoms, such as ethylene oxide.

The caprolactone polyesters are substantially linear, hydroxyl terminated polymers prepared by reacting a caprolactone having 6 to about 8 carbon atoms in the ring, preferably 6 carbon atoms, with a glycol having 4 to 7 carbon atoms and preferably 4 to 6 carbons. Various suitable caprolactones include ε-caprolactone, zeta-caprolactone and eta-caprolactone. Alkyl substituted caprolactones can be used with alkyl substituents containing 1 to 2 carbon atoms selected from methyl and ethyl radicals, such as methyl ε-caprolactone. Desirably, the caprolactone polyester has a molecular weight in the range of about 800 to about 2200, preferably about 1200 to about 2100, with corresponding hydroxyl numbers in the range of about 140 to about 45 and about 95 to about 55 respectively.

The adipates and azelates preferably have a molecular weight in the range of about 800 to about 2200 with a corresponding hydroxyl number in the range of about 140 to about 50.

Various suitable glycols for the preparation of the polyester polyols include straight chain aliphatic hydrocarbon diols, preferably hydroxyl terminated diols, and alkylene ether glycols, preferably hydroxyl terminated, for preparing the caprolactone polyesters, the adipates and the azelates. Representative of the staright chain aliphatic hydrocarbon hydroxyl terminated diols are 1,4-butane diol, 1,5-pentane diol, 1,6-hexane diol, 1,7-heptane diol. Representative of the alkylene ether glycols is diethylene glycol. The hydrocarbon diols are generally desired for the adipates and azelates with the 1,4-butane diol and 1,6-hexane diol being preferred. The caprolactone polyester of ε-caprolactone and diethylene glycol and polyesters selected from tetramethylene adipate, 1,6-hexane diol adipate, tetramethylene azelate and 1,6-hexane diol azelate are particularly desirable. The tetramethylene adipates and azelates are, of course, prepared from 1,4-butane diol and appropriate acid. The polyesters are typically formed at a temperature of from about 50° C. to about 300° C. and preferably in the range of about 120° C. and 200° C. A catalyst can be used to increase the reaction rate, if desired. For a more detailed description of preparation of various suitable caprolactone polyesters, reference is made to U.S. Pat. 2,933,478.

The resilient polyureaurethane composition can be prepared by first reacting the polyether polyol or polyether polyol and polyester polyol with the diisocyanate under substantially anhydrous conditions at a temperature of from about 100° C. to about 150° C. for about 30 to about 60 minutes. This reaction can be conducted at atmospheric or above or below atmospheric pressure. A catalyst can be added to the diisocyanate-polymeric polyol or polyol and polyester reaction mixture to reduce its reaction time. When such a catalyst is used, it is usually added to the reaction mixture before the addition of the diisocyanate or with the addition of the diisocyanate. Various catalysts can be used examplatory of which are the amine catalysts, such as triethyl amine, n-methyl-morphline, and n-ethyl morphline.

The diamine curative is then added to and mixed with the polymeric product of this reaction, sometimes called a prepolymer, under essentially anhydrous conditions. The resulting polyureaurethane reaction mixture is then cast in a suitable mold and cured to form the shaped resilient polyureaurethane composition of this invention. The said reaction mixture can be cured at about 20° C. to about 50° C., although faster cures can be obtained at higher temperatures, for example, about 50° C. to about 200° C. Normally, the reaction mixture is allowed to cure at 135° C. from 16 to about 24 hours.

When the shaped resilient polyureaurethane composition is prepared by pouring the polyureaurethane reaction mixture into a mold having the desired configuration and then curing the polyureaurethane reaction mixture, metal plates suitable for use as force-receiving plates for the shock absorbing device of this invention can be placed in the mold before curing the polyureaurethane reaction mixture. If desired, a suitable bonding cement, such as a phenolic or polyester-polyisocyanate adhesive, may be applied to the metal plates. Examplatory are the cements taught to be useful in U.S. Pat. 2,992,939 and Australian Pat. 256,373. By curing the polyureaurethane reaction mixture in the presence of the said metal plates, a metal plate is adhered to at least one of the force-receiving surfaces of the polyureaurethane member to form a laminate of the structure shown in FIGS. 1 and 2, for instance. Suitable metal plates generally conform to the planar dimensions of the force-receiving surfaces of the shock absorbing units and have a thickness in the range of from about 1/16 to about 1/2 inch, preferably from about 1/8 to about 1/4 inch, or from about 100 to about 200 mils. It is preferable to use steel plates for the force-receiving surfaces, such as hot-rolled mild steel having a carbon content in the range of from about a 10/15 to about a 10/30 Society of Automotive Engineers' (SAE) classification.

For further understanding of the invention, reference may be had to the accompanying drawing in which.

Figure 1:
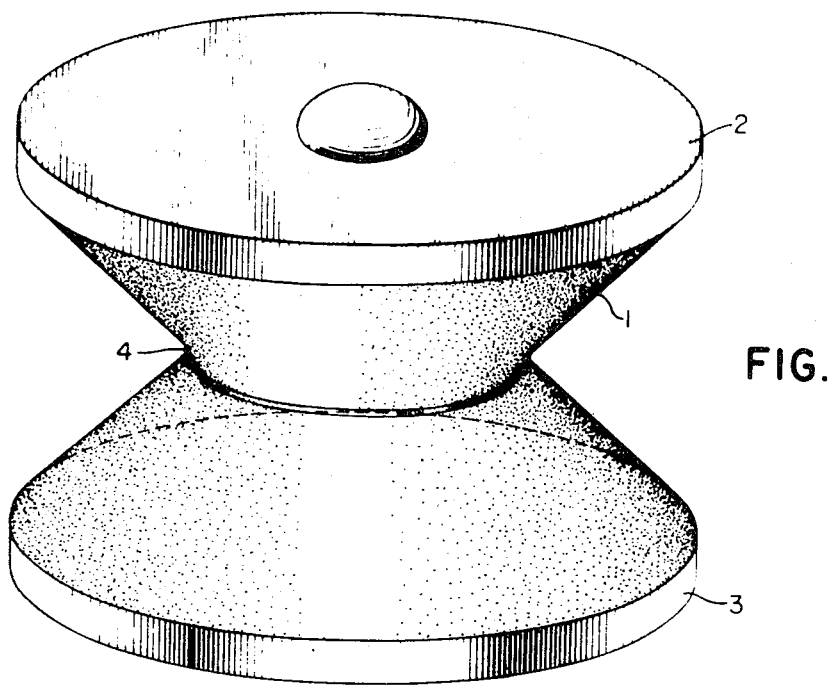
FIG. 1 is a perspective view illustrating one form of the shock absorbing device.
Figure 2:
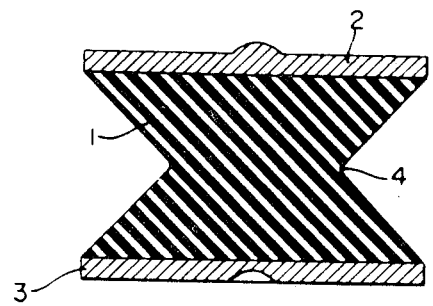
FIG. 2 is a vertical longitudinal sectional view further illustrating the shock absorbing device.
Figure 3:
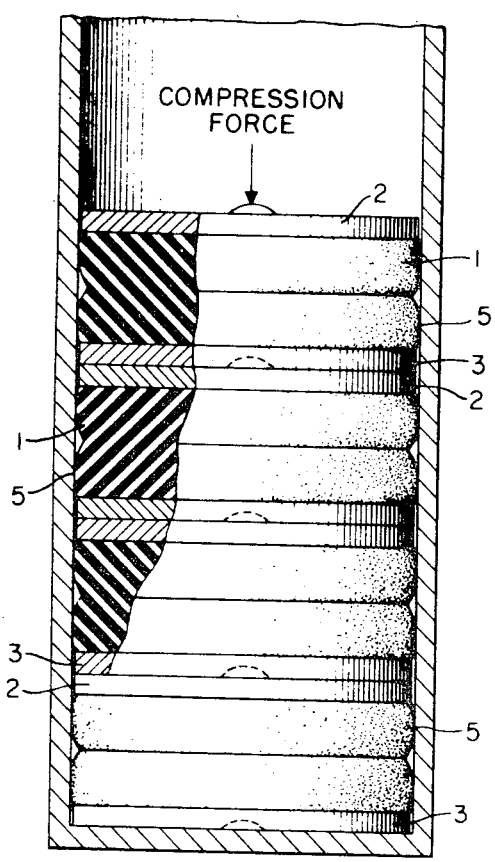
FIG. 3 is a vertical longitudinal sectional view of shock absorbing devices of the type shown in FIG. 1 and FIG. 2 placed in a supporting cylinder and disposed transversally to a compression force wherein the said shock absorbing devices are compressed to about 40 percent of their original height.

Referring to the drawings, the shock absorbing devices or units shown in FIG. 1 and FIG. 2 comprise the improved resilient, cured polyureaurethane member 1 bonded or laminated to two opposite and substantially parallel force-receiving hot-rolled mild steel plates 2 and 3. A portion of the side-wall of the resilient polyureaurethane member is concave in the form of a V-shaped groove 4. The ratio of the volume displaced by the groove to the volumes of the polyureaurethane member plus that displaced by the groove times 100 is about equal to the percent compression anticipated. A suitable railroad draft gear can be formed as illustrated in FIG. 3, under a suitable compression load, the resilient cured polyureaurethane members deform and their side-walls are forced laterally outward (5).

The following example further illustrates the objects and advantages of this invention. The parts and percentages are by weight unless otherwise indicated.

EXAMPLE I

Experiments A–F were conducted by first charging to reactors A–F respectively, under essentially anhydrous conditions, various amounts of polyether and polyester polyols consisting of polytetramethylene ether glycols having molecular weights of about 1000 and of about 2000, 1,6-hexane diol adipate and 1,6-hexane diol azelate having molecular weights of about 1000, tetramethylene azelate having a molecular weight of about 2000, and polyesters of ε-caprolactone and diethylene glycol having molecular weights of about 1250 and of about 2000. The polyester polyols had acid numbers of less than about 0.5. The mixtures of polyols were stirred (as a precautionary measure to remove any potential moisture) under reduced pressure at about 110° C. for about an hour. To the polyol mixtures were then added various amounts of diphenylene methane-4,4'-diisocyanate (MDI) or mixtures of 2,4- and 2,6-toluene diisocyanate (TDI) containing about 80 weight percent 2,4-toluene diisocyanate. Mixtures A–E were stirred and allowed to react for about 15 minutes at about 100° C. to about 120° C. with a reduced pressure then being applied. Mixture F was similarly reacted with the reduced pressure being substantially immediately applied. The purpose of the reduced pressure was to remove by-products, such as water and gaseous materials, from the reaction system. To the mixtures was then added amounts of molten orthodichlorobenzidine (ODCB) and methylene bis ortho chloroaniline (MOCA) to form a polyureaurethane reaction mixture. In some instances, a portion of polytetramethylene ether glycol having a molecular weight of about 1000 or the ε-caprolactone polyester of about 1250 molecular weight, was added to reduce the viscosity of the MOCA and lengthen the pot life of the curing reaction mixture.

TABLE 1

| | A | B | C | D | E | F |
|---|---|---|---|---|---|---|
| Polytetramethylene ether glycol (1000) | 56 | 75 | 75 | 56 | 31.6 | 67.2 |
| Hexane diol adipate (1000) | | 22 | | | | |
| Hexane diol azelate (1000) | | | | 22 | | |
| ε-Caprolactone polyester (1250) | | | | | 52.6 | |
| Polytetramethylene ether glycol (2000) | 22 | | | 22 | 15.8 | |
| ε-Caprolactone polyester (2000) | | | | | | 32.8 |
| Tetramethylene azelate (2000) | | 25 | 25 | | | |
| 80/20 toluene diisocyanate | 34.4 | 30.4 | 30.4 | 34.4 | 29.9 | |
| MDI | | | | | | 46.5 |
| MOCA | 19.8 | 8.74 | 11.7 | 19.8 | 17.2 | 18.6 |
| ODCB | | 8.28 | 5.54 | | | |
| ε-Caprolactone polyester (1250) | | | | | 5.3 | |
| Polytetramethylene ether glycol (1000) | 9.9 | | | 9.9 | | 9.3 |

The reaction mixtures were then immediately poured or cast into molds in which had been inserted two circular hot-rolled mild steel metal plates having an SAE classification of about 10/20 and having diameters of about 6.5 inches and thicknesses of 135 mils. The plates had been coated with a polyester-polyisocyanate type of adhesive to enhance their adhesion to the cast polyureaurethane. The mixtures were cured in the molds at about 135° C. for about 24 hours to provide polyureaurethane steel laminates as shock absorbing units similar to that shown in FIGS. 1–3 in the drawing of this specification, the shaped resilient polyureaurethane compositions having diameters of 6.5 inches and thicknesses of 1.5 inch. Their sidewalls were in the shape of a V-shaped groove having a volume equal to about ⅔ of the polyureaurethane The shock absorbing units deflected (compressed) about 0.44 to about 0.55 inch at about 25° C. upon the application of about 1800 pounds per square inch uniformly to the surface areas of steel force-receiving plates. Actually, the test was conducted by placing two of such units in series under test, and their total deflection was about 0.88 to about 1.1 inch.

Shock absorbers having polyureaurethane members prepared according to this invention but having too low a mole ratio of diisocyanate to polymeric polyester, typically deflect more than about 0.6 inch when subjected to this test. Such shock absorbing units when used in a railroad car draft gear typically absorb insufficient amount of energy and, thus, are usually fully compressed before sufficient compressive force energy is absorbed by the gear during useage. Such shock absorbers having a polyureaurethane member having too high a ratio of diisocyanate to polymeric polyester typically deflect less than about 0.30 inch when subjected to this test. When used in a railroad draft gear, they typically absorb an insufficient amount of energy before transmitting the energy, or force resulting from coupling the railroad car, through the draft gear and also break down during usage.

Portions of each of the polyureaurethane reaction mixtures were cured and shaped to form discs having diameters of about 1.13 inch and thicknesses of about 0.5 inch. At about —40° C., a pressure applied to their flat surfaces of about 5800 to about 7300 pounds per square inch was required to compress the individual discs about 40 percent of their original thicknesses. At 24° C. such a compression required from about 2000 to about 2500 pounds per square inch, with a maximum of about 2700 being desired.

Thus, the shock absorbing units had desirable load deflections or compressions for use in railroad draft gears and also as bridge support pads for a wide range of temperatures, such as from about —40° C. to about 25° C. and preferably up to about 50° C.

The shock absorbing units are desirably characterized by a —35° C. hammer drop test and by an AAR endurance test.

A hammer drop test is described by first vertically loading a draft gear cylinder with 10 of the shock absorber units or pads similar to FIGS. 1–3 in series to a shock load with their adherent metal force-receiving plates facing each other to form a draft gear. A 27,000 pound hammer is dropped onto the end of the vertically positioned gear from several heights. The impact shock is measured, typically expressed as the height the hammer is dropped in inches, and the capacity of the gear is determined. The capacity of the gear is measured at the point where the gear "bottoms out," i.e., when it starts to transmit shock directly from the hammer drop rather than cushion and absorb the shock force. Thus, the gear can typically "bottom out" with 27,000 pound hammer being dropped from a height of about 18 inches for a 40,000 foot pound shock force. The draft gear is then cooled to —35° C. and drop hammered three times with the 27,000 pound hammer for the —35° F. hammer drop test. The capacity is measured and the gear disassembled followed by examining the pads. A criteria for failing the hammer drop test is deterioration of the pads such as cracking, particularly at —35° C., or by bottoming out at a shock load less than about 40,000 foot pounds at about 25° C.

The AAR Endurance Test (American Association of Railroads) can be referred to as AAR Spec. M–901–E Endurance Test. The test is generally similar to the —35° C. hammer drop test but starting at room temperature or about 25° C. A 27,000 pound hammer is dropped at variable vertical heights of from about one to about 30 inches over a period of time until 35 million foot pounds of energy have been expended upon the gear which typically comprises 10 of the shock absorbing units or pads. The capacity of the gear is measured both at the beginning and at the end of the test as well as periodically during the test. The gear capacities before, during and after the test are then compared to determine any changes in capacity which the gear may undergo. The gear is then disassembled and inspected for deterioration of the pads. Appreciable loss of capacity or deterioration of the pads, such as by excessive cracking, are criteria for failing the endurance test. It is preferred that the gear, when composed of 10 of the pads, has a capacity of at least about 40,000 foot pounds before bottoming out, or a capacity of about 4,000 foot pounds per pad at about 25° C. In this test, the 27,000 pound hammer shocks are applied gradually over a period of time to prevent excessive heat build-up because the gear heats up considerably after each hammer drop.

The shock absorbing units of this invention and particularly as described in these examples, have unique utility as railroad draft gear shock absorbing units. In practice, the shock absorbing device of a railroad draft gear is typically assembled by the series loading of 8 to 14, preferably 10, of the shock absorbing units of this invention and preferably of the prescribed 6.5 inch diameter shaped polyureaurethane disc having the 1.5 inch thickness and V-grooved sides, followed by placing the units in the device under about 20,000 pounds force for operational use in the railroad car.

In the practice of this invention, it is typically desired that the polyureaurethane contain an antioxidant amount of an antioxidant. Thus, it may be typically desired that the polyurethane contains in the range of about 0.5 to about 3 and more preferably, about 1 to about 2 weight percent of an antioxidant, such as an amine or a hindered phenolic type. Usually an amine antioxidant is satisfactory. Usually the antioxidant is mixed with a diol diisocyanate mixture or product or, more preferably, is simply mixed with the polyol. The addition of the antioxidant is primarily to enhance the maintenance of the shock absorber's desired properties over a long period of time. In Example I of this specification, for instance, approximately 1.5 weight percent of an amine antioxidant, based on the polyureaurethane, was typically mixed with the polyol or polyol mixture before adding the diisocyanate.

While certain representative embodiments and details have been shown for the purpose of illustrating the invention, it will be apparent to those skilled in this art that various changes and modifications may be made therein without departing from the spirit or scope of the invention.

What is claimed is:

1. A resilient, shock absorbing polyureaurethane composition prepared by the method which comprises reacting at least one diamine selected from the group consisting of orthodichlorobenzidine and 4,4'-methylene bis-orthochloroaniline with the reaction product of (A) at least one diisocyanate selected from diphenylene methane-4,4'-diisocyanate and a mixture of 2,4- and 2,6-toluene diisocyanates containing from about 60 to about 100 weight percent 2,4-toluene diisocyanate with (B) a mixture consisting of both polyether polyols and polyester polyols having a total average molecular weight in the range of about 900 to about 1500, said molecular weight being equivalent to the result of mixing (1) about 60 to about 85 weight percent of (a) at least one polyetera-methylene ether glycol having an average molecular weight in the range of about 800 to about 1200 or (b) a mixture comprising about 30 to about 80 weight percent of at least one of said polytetramethylene ether glycols and correspondingly about 70 to about 20 weight percent of at least one polyester polyol having an average molecular weight in the range of about 800 to about 1500 and correspondingly (2) about 40 to about 15 weight percent of polyols having an average molecular weight in the range of about 1800 to about 2200 selected from (a) at least one polytetramethylene ether glycol or (b) at least one polyester polyol, wherein said polyester polyols of 1(b) and 2(b) are individually selected from at least one of (x) caprolactone polyesters prepared from caprolactones containing 6 to 8 carbon atoms and glycols containing 4 to 7 carbon atoms, (y) adipates of adipic acid and glycols containing 4 to 7 carbon atoms and (z) azelates of azelaic acid and glycols containing 4 to 7 carbon atoms, where the ratio of isocyano groups of the diisocyanate to the sum of hydroxyl groups of the polyols is from about 1.7 to about 2.5, where the ratio of primary amino groups of the diamine to excess isocyanato groups over the sum of hydroxyl groups of the polyols is in the range of about 0.6 to about 1 and where the acid number of the polyols is less than about 1. containing 4 to 7 carbon atoms, where the ratio of isocyanato groups of the diisocyanate to the sum of hydroxyl hydroxyl groups of the polyols is from about 1.7 to about 2.5, where the ratio of primary amino groups of the diamine to excess isocyanato groups over the sum of hydroxyl groups of the polyols is in the range of about 0.6 to about 1 and where the acid number of the polyols is less than about 1.

2. The polyureaurethane composition of claim 1 characterized by deflecting from about 0.3 to about 0.6 inch at about 25° C. upon the application of about 1800 pounds per square inch uniformly to the end surface areas of the said resilient composition when the said composition is a generally disc shaped cylindrical element with circular parallel end surfaces having diameters of about 6.5 inches, a height of about 1.5 inches, and a side-wall connecting the end surfaces substantially in the form of a V-shaped groove having substantially equal length sides, the said groove extending between the said end surfaces, the volume of the solid portion of the said element being about 150 percent of the volume of the said groove.

3. The polyureaurethane composition of claim 2 where the mixture of toluene dissocyanates contains from about 70 to about 90 weight percent 2,4-toluene diisocyanate and the polyester polyols are selected from at least one of (x) caprolactone polyesters prepared from ε-caprolactone and glycols selected from diethylene glycol and straight chain aliphatic hydrocarbon diols having 4 to 6 carbon atoms, (y) adipates of adipic acid and straight chain aliphatic hydrocarbon diols having 4 to 6 carbon atoms and (z) azelates of azelaic acid and straight chain aliphatic hydrocarbon diols having 4 to 6 carbon atoms.

4. The polyureaurethane composition of claim 3 characterized by a —40° C. cold temperature compression test where the said composition, at —40° C., when shaped and cured to a solid circular disc with a straight sidewall, having a diameter of about 1.13 inches and a thickness of about 0.5 inch, requires a maximum pressure of 7500 pounds per square inch applied to its flat surfaces to compress the disc 40 percent.

5. The polyureaurethane composition of claim 4 where the polyester polyols are selected from at least one of (a) caprolactone polyesters prepared from ε-caprolactone and diethylene glycol. (b) adipates of adipic acid and glycols selected from 1,4-butane diol and 1,6-hexane diol and (c) azelates of azelaic acid and glycols selected from 1,4-butane diol and 1,6-hexene diol, where the ratio of isocyanato groups of the diisocyanate to the sum of the said hydroxyl groups of the polyols is from about 1.8 to about 2.2, where the ratio of primary amino groups to excess isocyanato groups over the sum of the said hydroxyl groups of the polyols is from about 0.7 to about 0.95.

6. The polyureaurethane composition of claim 5 where the polyether polyol-polyester polyol mixture is selected from (a) polytetramethylene ether glycols having an average molecular weight of about 900 to about 1100 or a mixture with molecular weights of about 900 to about 1100 and of about 1900 to about 2100 and (b) at least one of the polyester polyols selected from hexane diol adipate and azelate having molecular weights of about 800 to about 1200, tetramethylene azelate having a molecular weight of about 1800 to about 2200 and polyesters of ε-caprolactone and diethylene glycol having molecular weights of about 1100 to about 1400 and about 1800 to about 2200.

7. A method of preparing the polyureaurethane composition of claim 1 which comprises reacting at least one diamine selected from the group consisting of orthodichlorobenzidine and 4,4'-methylene bis-orthochloroaniline with the reaction product of (A) at least one diisocyanate selected from diphenylene methane-4,4'-diisocyanate and a mixture of 2,4- and 2,6-toluene diisocyanates containing from about 60 to about 100 weight percent 2,4-toluene diisocyanate with (B) a mixture consisting of both polyether polyols and polyester polyols having a total average molecular weight in the range of about 900 to about 1500, said molecular weight being equivalent to the result of mixing (1) about 60 to about 85 weight percent of (a) at least one polytetramethylene ether glycol having an average molecular weight in the range of about 800 to about 1200 or (b) a mixture comprising about 30 to about 80 weight percent of at least one of said polytetramethylene ether glycols and correspondingly about 70 to about 20 weight percent of at least one polyester polyol having an average molecular weight in the range of about 800 to about 1500 and correspondingly (2) about 40 to about 15 weight percent of polyols having an average molecular weight in the range of about 1800 to about 2200 selected from (a) at least one polytetramethylene ether glycol or (b) at least one polyester polyol, wherein said polyester polyols of 1(b) and 2(b) are

11 individually selected from at least one of (x) caprolactone polyesters prepared from caprolactones containing 6 to 8 carbon atoms and glycols containing 4 to 7 carbon atoms, (y) adipates of adipic acid and glycols containing 4 to 7 carbon atoms and (z) azelates of azelaic acid and glycols containing 4 to 7 carbon atoms.

8. A shock absorbing unit suitable for use in a railroad draft gear comprising a shock absorbing element, the said element comprising a shaped solid resilient polyureaurethane composition of claim 1, having two opposing and substantially parallel force-receiving surfaces connected by at least one side-wall and having rigid force-receiving plates adhered to its force-receiving surfaces.

9. The shock absorbing unit of claim 8 characterized by deflecting from about 0.3 to about 0.6 inch at about 25° C. upon the application of about 1800 pounds per square inch uniformly to the end surface areas of the said resilient composition when the said composition is a generally disc shaped cylindrical element with circular parallel end surfaces having diameters of about 6.5 inches, a height of about 1.5 inches, and a side-wall connecting the end surfaces substantially in the form of a V-shaped groove having substantially equal length sides, the said groove extending between the said end surfaces, the volume of the solid portion of the said element being about 150 percent of the volume of the said groove, and where the said rigid force-receiving plates are steel plates.

10. A shock absorbing unit having the polyureaurethane composition and shape prescribed by claim 9 where the mixture of toluene diisocyanates contains from about 70 to about 90 weight percent 2,4-toluene diisocyanate and the polyester polyols of the polyureaurethane composition are selected from at least one of (a) caprolactone polyesters prepared from ε-caprolactone and glycols selected from diethylene glycol and straight chain aliphatic hydrocarbon diols having 4 to 6 carbon atoms, (b) adipates of adipic acid and straight chain aliphatic hydrocarbon diols having 4 to 6 carbon atoms and (c) azelates of azelaic acid and straight chain aliphatic hydrocarbon diols having 4 to 6 carbon atoms.

11. The shock absorbing unit of claim 10 where the polyureaurethane composition is characterized by a −40° C. cold temperature compression test where the said composition, at −40° C. when shaped and cured to a solid circular disc with a straight side-wall, having a diameter of about 1.13 inches and a thickness of about 0.5 inch requires a maximum pressure of 7500 pounds per square inch applied to its flat surfaces to compress the disc 40 percent.

12. The shock absorbing unit of claim 10 where the polyester polyols of the shaped polyureaurethane composition are selected from at least one of (a) caprolactone polyesters prepared from ε-caprolactone and diethylene glycol, (b) adipates of adipic acid and glycols selected from 1,4-butane diol and 1,6-hexane diol and (c) azelates of azelaic acid and glycols selected from 1,4-butane diol and 1,6-hexane diol, where the ratio of isocyanato groups of the diisocyanate to the sum of the said hydroxyl groups of the polyols is from about 1.8 to about 2.2, where the ratio of primary amino groups to excess isocyanato groups over the sum of the said hydroxyl groups of the polyols is from about 0.7 to about 0.95.

13. The shock absorbing unit of claim 12 where the polyester polyol-polyester polyol mixture is selected from (a) polytetramethylene ether glycols having an average molecular weight of about 900 to about 1100 or a mixture with molecular weights of about 900 to about 1100 and of about 1900 to about 2100 and (b) at least one of the polyester polyols selected from hexane diol adipate and azelate having molecular weights of about 800 to about 1200, tetramethylene azelate having a molecular weight of about 1800 to about 2200 and polyesters of ε-caprolactone and diethylene glycol having molecular weights of about 1100 to about 1400 and about 1800 to about 2200.

12

14. The shock absorbing unit of claim 12 having the prescribed shape where its force-receiving plates are hot-rolled mild steel having a thickness in the range of about 100 to about 200 mils and where the said unit is characterized by not appreciably deteriorating when submitted to a test at about 25° C. which comprises forming a shock absorbing device by loading ten such shock absorbing units in a cylinder in series to a shock load with their force-receiving plates facing each other, applying successive shocks to the device by dropping a 27,000 pound hammer thereon at variable heights of from about one to about 30 inches until 35 million foot pounds of energy have been expended upon the assembly, the shocks being applied gradually to prevent excessive heat build-up.

15. A shock absorbing device of a railroad draft gear comprising a series of about 8 to about 14 of the shock absorbing units of claim 9 of the prescribed shape loaded in a cylinder in series to a shock load with their rigid force-receiving plates facing each other.

16. The shock absorbing device according to claim 15 comprising ten of the series loaded shock absorbing units where the force receiving plates of the units are hot-rolled mild steel having a thickness in the range of about 100 to about 200 mils and where the polyester polyols of the shaped polyureaurethane composition are selected from at least one of (a) caprolactone polyesters prepared from ε-caprolactone and diethylene glycol, (b) adipates of adipic acid and glycol selected from 1,4-butane diol and 1,6-hexane diol and (c) azelates of azelaic acid and glycols selected from 1,4-butane diol and 1,6-hexane diol, where the ratio of isocyanato groups of the diisocyanate to the sum of the said hydroxyl groups of the polyols is from about 1.8 to about 2.2, where the ratio of primary amino groups to excess isocyanato groups over the sum of the said hydroxyl groups of the polyols is from about 0.7 to about 0.95.

17. A resilient shock absorbing bridge support pad comprising a shaped polyureaurethane composition of claim 1 supportably and shock absorbingly positioned between a bridge load carrying member and a bridge foundation member.

18. The shock absorbing unit of claim 11 characterized by deflecting from about 0.4 to about 0.5 inch at about 25° C. upon the application of about 1800 pounds per square inch uniformly to the end surfaces of the said resilient polyureaurethane composition having the prescribed disc shape where the said polyester polyol is a caprolactone polyester having an average molecular weight in the range of about 1800 to about 2100 prepared from ε-caprolactone and diethylene glycol.

19. A method of preparing the shock absorbing unit of claim 8 which comprises applying a polyureaurethane reaction mixture into a mold having the required configuration and having metal force-receiving plates inserted therein followed by curing the said reaction mixture where the said polyureaurethane reaction mixture is prepared by mixing at least one diamine selected from the group consisting of orthodichlorobenzidine and 4,4'-methylene bis-orthochloroaniline with the reaction product of (A) at least one diisocyanate selected from diphenylene methane-4,4'-diisocyanate and a mixture of 2,4- and 2,6-toluene diisocyanates containing from about 60 to about 100 weight percent 2,4-toluene diisocyanate with (B) a mixture consisting of both polyether polyols and polyester polyols having a total average molecular weight in the range of about 900 to about 1500, said molecular weight being equivalent to the result of mixing (1) about 60 to about 85 weight percent of (a) at least one polytetramethylene ether glycol having an average molecular weight in the range of about 800 to about 1200 or (b) a mixture comprising about 30 to about 80 weight percent of at least one of said polytetramethylene ether glycols and correspondingly about 70 to about 20 weight percent of at least one polyester polyol having an average molecular weight in the range of about 800 to about 1500 and correspondingly (2) about 40 to about 15 weight percent of polyols having an average molecular weight in the range of about 1800 to about 2200 selected from (a) at least one polytetramethylene ether glycol or (b) at least one polyester polyol, wherein said polyester polyols of 1(b) and 2(b) are individually selected from at least one of (x) caprolactone polyesters prepared from caprolactones containing 6 to 8 carbon atoms and glycols containing 4 to 7 carbon atoms, (y) adipates of adipic acid and glycols containing 4 to 7 carbon atoms and (z) azelates of azelaic acid and glycols containing 4 to 7 carbon atoms.

References Cited

UNITED STATES PATENTS 3,504,901  4/1970  Ditty _____ 267—138

WILLIAM A. POWELL, Primary Examiner

U.S. Cl. X.R.

161—116, 190; 260—858; 267—138, 141

UNITED STATES PATENT OFFICE

CERTIFICATE OF CORRECTION

Patent No. 3,677,869      Dated July 18, 1972

Inventor(s) Daniel A Chung and Charles J Pearson

It is certified that error appears in the above-identified patent and that said Letters Patent are hereby corrected as shown below:

Column 2, line 59, after the word equal add the word -- length --.

Column 4, line 33, "polyols" should read -- polyol --.

Column 9, Claim 1, lines 33 & 34, "polyeteramethylene" should read -- polytetramethylene --.

Column 9, Claim 1, line 52, "isocyano" should read -- isocyanato --.

Column 9, Claim 1, delete lines 59-66.

Column 10, Claim 5, line 30, "1,6-hexene" should read -- 1,6-hexane --.

Column 11, Claim 13, line 64, "polyester polyol-polyester polyol" should read -- polyester polyol-polyether polyol --.

Signed and sealed this 3rd day of April 1973.

(SEAL)
Attest:

EDWARD M. FLETCHER, JR.
Attesting Officer

ROBERT GOTTSCHALK
Commissioner of Patents